US006958837B2

(12) United States Patent
Hartwig

(10) Patent No.: US 6,958,837 B2
(45) Date of Patent: Oct. 25, 2005

(54) METHOD FOR PRODUCING PICTURE ELEMENT GROUPS BY MEANS OF LASER RAYS IN SPACE AND ON A PLANE

(76) Inventor: Rüdiger Hartwig, Bergstarsse 1, Bad Bentheim (DE), 48455

( * ) Notice: Subject to any disclaimer, the term of this patent is extended or adjusted under 35 U.S.C. 154(b) by 81 days.

(21) Appl. No.: 10/381,538

(22) PCT Filed: Sep. 24, 2001

(86) PCT No.: PCT/EP01/11000

§ 371 (c)(1),
(2), (4) Date: Mar. 25, 2003

(87) PCT Pub. No.: WO02/25353

PCT Pub. Date: Mar. 28, 2002

(65) Prior Publication Data

US 2004/0012541 A1 Jan. 22, 2004

(51) Int. Cl.$^7$ .............................................. G02B 26/08
(52) U.S. Cl. ....................... 359/201; 359/204; 359/213; 359/900
(58) Field of Search ................................ 359/198–204, 359/213, 900; 358/489, 493–495, 296

(56) References Cited

U.S. PATENT DOCUMENTS 6,493,130 B2 * 12/2002 Iizuka ........................ 359/305

* cited by examiner

*Primary Examiner*—James Phan
(74) *Attorney, Agent, or Firm*—Technoprop Colton LLC

(57) ABSTRACT

The invention relates to a method for producing picture element groups by means of laser rays in space and on a plane. The laser ray, functioning as a picture ray, is divided into a main ray and one or more secondary rays. The secondary rays are transformed into groups of individual picture elements by adapted devices. In the pictorial representation of 3D images, secondary images arise consisting of an individual picture group made of individual picture elements.

15 Claims, 4 Drawing Sheets

Stand der Technik

METHOD FOR PRODUCING PICTURE ELEMENT GROUPS BY MEANS OF LASER RAYS IN SPACE AND ON A PLANE

BACKGROUND OF THE INVENTION

1. Technical Field

The invention relates to an apparatus for producing picture element groups in space, to designs of such an apparatus and to methods for producing picture element groups in space as realized by such apparatus.

"Picture element groups" are arrangements of picture elements which are similar in geometric appearance and which can be varied with respect to location, size and orientation. They are specified by a corresponding number of parameters and produced by adapted devices in deflection systems. The picture elements of a picture element group are made into a group pursuant to a given general instruction and simplify the scope and time involved in the formation of the overall image. This results in an image with greater informational content achieved by a relatively lower amount of technical effort.

2. Prior Art

DE 2622802 C2 discloses a 3D display for generating picture elements in a cylindrical space which as a whole produce real 3D images. The term "real" here means that the spatial laser picture, in contrast to 3D representations, floats in an apparently empty space on flat screens or in stereoscopic images. It can be viewed from all surrounding directions, like a fish in an aquarium, without the help of any optical aids. Such images are commonly referred to as "volumetric 3D displays". The 3D image in DE 2622802 is generated by projecting a laser beam at a rotating helical surface known in practice as a "helix". For that reason, this system is designated as a "helix-laser-3D display".

A helix-laser-3D display in its most simple form is shown in FIG. 1. The laser 1 emits short light-induced pulses which are directed by a deflection system as image beam 2 onto the helix 6, where picture elements 10 are produced. Although the picture elements at adjacent locations x,y,z, due to the continual rotation of the helix, can only be generated a completely different points of time, they are perceived by the human eye as interconnected adjacent picture elements. The helix is made of thin, translucent material such that the image beam is scattered upwards and downwards in approximately the same possible degree of diffusion. It rotates in a transparent cylinder 7 about a rotation axis 8 at a rate of 20 revolutions per second and is invisible to the viewer. The picture elements "float" in space.

For simple demonstrations of this principle using but a few picture elements or a loop of pre-programmed spatial images one may employ an opto-mechanical deflection system. It consists of two mirrors that can be swiveled orthogonally to one another: the x-deflection mirror 3 and the y-deflection mirror 4. If necessary, a stationary tilted mirror 5 deflects the image beam onto the helix 6. The x,y,z coordinates of the desired picture element are predetermined by the computer and adjust via actuators the deflection mirrors 3 and 4 for x and y, as well as a timed pulse for the height z, which is generated at the start of a light flash of the laser 1 to correspond to the rotational angle 9 of the helix. The horizontal size of the picture element is a function of the diameter of the image beam 2 and its height is a function of the duration of the flash. Dedicated applications require a very large number of picture elements, if possible with a plurality of features. Opto-mechanical deflection systems, such as the mechanical rotational mirror described here, are inadequate for this purpose.

For military applications, the helix-laser-3D display was built by the US Navy at great technical expense and employed for different purposes (Technical Report 1793, Revision 2, October 1998, US Navy Space and Naval Warfare Systems Center, San Diego, Calif. 92152-5001). For this purpose high-performance opto-electronic deflection systems were developed. They are capable of generating 3D landscapes consisting of more than 100,000(1) minute picture elements which are refreshed more than 20 times per second, in three colors, dynamic and with variable intensity. These helix-laser-3D displays were first used for submarine navigation, later for air-traffic control and then for medical and CAD purposes as well.

For non-military applications such systems are still too costly. Even the generation of a modest number of independent and randomly variable picture elements requires a disproportionately high engineering effort for the deflection system. As already mentioned, such a system must be able to direct the image beams for every single picture element at the right time onto the desired x,y,z position and have it flashed at the correct time. Here one must always keep in mind that, due to helix rotation, each x,y,z picture element can only be generated in space at a very brief and precise moment in time. This means that the 3D image must be composed point by point in temporal succession at x,y,z positions generally located far from each other. The coordination of position and time requires a very rapid change of the image beam from every x,y,z position to every other x,y,z position located at an arbitrary distance and likewise requires a very high degree of precision in stroboscope timing and duration. The efficiency of a helix-laser 3D display is gauged by how many picture elements with which variable features (color, intensity, etc.) the deflection system is able to generate with sufficient speed and compose them into a 3D scenario. The engineering effort for deflection systems increases exponentially with the number of desired picture elements.

The 3D images are usually composed point by point from individual picture elements. Each of these is defined by its x,y,z coordinate and by additional characteristics, which must be implemented by the deflection system. This means that every single picture element demands the same degree of effort from the deflection system regardless of its importance in the overall image.

U.S. Pat. No. 5,854,613 A discloses a possibility for multiplying image beams by using translucent mirrors to distribute the beams. Here the incident light beam is divided into two emitted beams having half of the light intensity, it being possible to generate a plurality of optical beams in succession with the same drop in light intensity. Each of the resulting optical beams requires its own deflection unit. Directed toward a desired x,y,z position, each sub-beam generates a single picture element in space.

BRIEF SUMMARY OF THE INVENTION

In light of the above, the object of the invention is the development of apparatus and methods to realize the generation of 3D images, i.e. picture elements in space, in the most simple and rapid manner possible. In the process this should also relieve universal deflection systems and release them for other tasks. A slightly greater engineering effort should generate an overall greater number of picture elements and in this way overcome the previous problem of bottlenecks. This would also provide the user with additional information which makes the 3D image scenario more realistic and facilitate interaction.

This object is realized with an apparatus for the production of picture elements in space in which light pulses are generated in rapid succession whose light is deflected by a deflection device in two independent orthogonal directions and directed onto a rotating projection surface on which the light pulses are visible as picture elements, the deflection device comprises a plurality of optical deflection elements which divide the incident light into a main beam and at least one secondary beam by generating a plurality of partial beams by separating at least one part of the incident beam's cross section, the deflection elements can be directed independent of one another and the partial beams can be influenced such that picture element groups of various kinds are generated.

The image beam can be divided by separating a self-contained part of the image beam's cross-section or by sifting out a portion of the image beam. After division, the secondary beam is subjected to various processes. This results in various kinds of picture element groups: those which undergo serial composition (successively in time) and appear to the viewer as blinking lights, and those which arise in parallel (simultaneous) fashion and appear to the viewer as being stationary. The picture element groups thus generated form the secondary images. The main image and secondary image taken together form the overall image. The viewer sees the overall image as a unit in which the main image can appear dominant, while the secondary image can stand out, for example, by virtue of the deliberately smaller size of its picture elements or by having blinking elements. Such features can be used to advantage for accompanying supplementary information.

The method pursuant to the invention should preferably be employed for applications capable of functioning with relatively few picture elements and which are suitable for the use of macro images, such as air-traffic control and CAD. Such applications have already been emphasized in DE 2622802.

The helix-laser 3D display was already used in the USA for air-traffic control in the Navy. There the entire flight scenario was composed by individual points in the cylinder. Newly added to this process is now the invention's use of secondary images which can symbolize flying objects, for instance, in the form of picture element patterns or show flight paths and flight speeds in the form of line elements. Furthermore, secondary images can be generated in the form of two-dimensional images of all flight activity on the base or lid of the cylinder which can be supplementally used interactively in conjunction with markings or variable map projections. Furthermore, objects in flight can be marked in space, i.e. with little additional effort, their position can be highlighted by means of appropriate macro images and/or by blinking and can therefore be recognized quickly.

Advantages are also presented for CAD applications because the computer geometry, on which CAD is based, is determined essentially by line elements and vectors. Macro images used in this branch can be represented by the picture element groups described here, thus making images more vivid and facilitating human-machine interaction.

BRIEF DESCRIPTION OF THE FIGURES

The exemplary embodiments of the invention will be described in more detail in the following by means of drawings which show FIG. 1 basic prior art FIG. 2 apparatus for producing horizontal linear picture element groups FIG. 3 compact embodiment of apparatus shown in FIG. 2

DETAILED DESCRIPTION OF THE PREFERRED EMBODIMENTS

Figure 1:
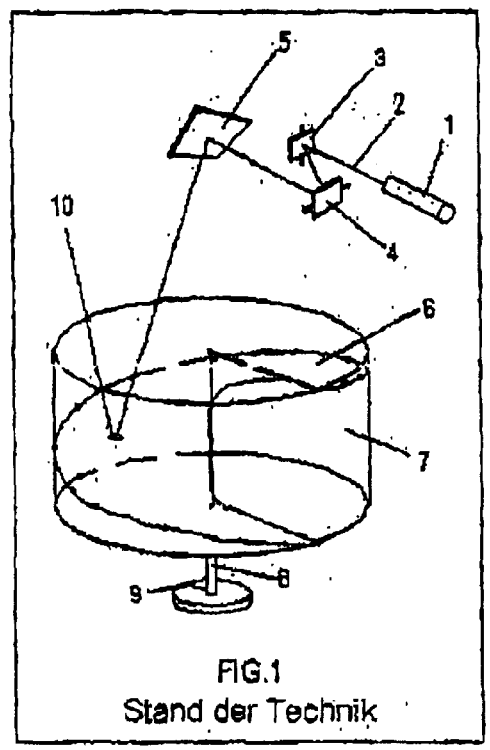
Figure 2:
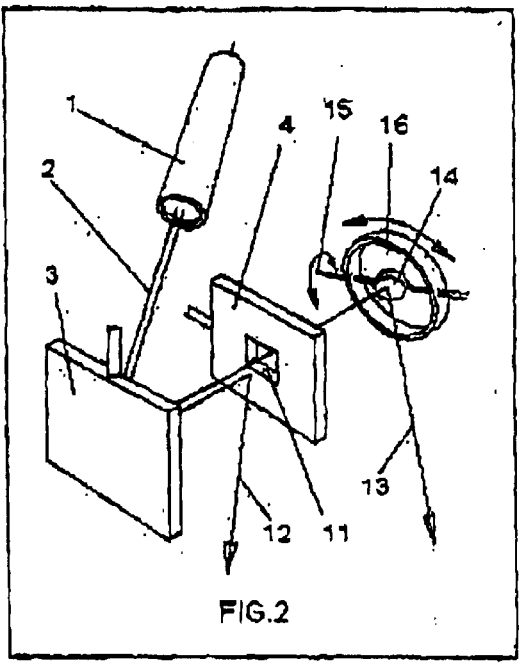

The apparatus pursuant to FIG. 2 comprises a x-deflection mirror 3 and a y-deflection mirror 4, which has a cutout 11 in the middle. Part of the image beam reflected by the deflection mirror 4 is reflected by the y-deflection mirror 4 as a main beam 12, while another part of the image beam is reflected by the secondary mirror 14 as a secondary beam 13. This secondary mirror is swivel-mounted in the rotation axis 15, which in turn rests in a ring 16 that can swivel orthogonally and with which the axis 15 can be turned. The light beams 12 and 13 run parallel to each other as long as the reflection planes of the mirrors 4 and 14 are aligned parallel to each other. Any twist of the mirror 14 about the rotation axis 13 or with the ring 16 alters the secondary beam 13, producing an independent picture element on the helix corresponding to its relative position. Proceeding from small twist increments 15 and 16, this additional picture element lies near the picture element produced by the main beam 12. Its size depends on the opening of the cutout 11.

This makes it possible to represent line segments of element groups on the helix. Their direction is determined by the position of the ring 16 and their length is determined by the extent of oscillation amplitude of the mirror 14 about the rotation axis 15. They can originate in the picture element produced by the main beam 12. They would thus appear as 3D vectors, similar in appearance to the vapor trails of a jet airplane. For flight-controllers, they can be seen as representing the speed and direction of an aircraft.

The oscillation of the secondary mirror can and should be constant, but independent of the rotation speed of the helix. The light flashes for the main beam and secondary beam 13 are identical. By forgoing any synchronization here, the partial picture elements appear in statistical distribution between the positional limits. This causes a line element marked by minutely flickering light flashes to appear in addition to the strictly stationary main picture element at the x,y,z position. For flight-control applications, the intensity of the light flashes can be set by the size of the cutout 11 and the appearance of the vapor trails can be set by the oscillation frequency of the rotation axis 15. The view of the elements in FIG. 2 has been deliberately exploded for easier understanding. In practice they are arranged as closely as possible.

Figure 3:
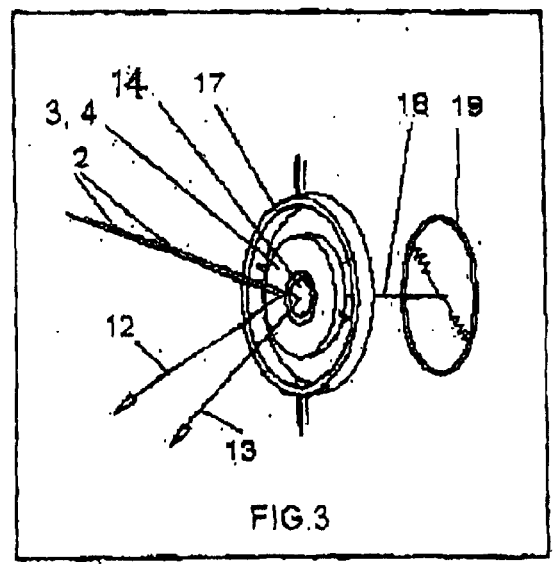

The apparatus pursuant to FIG. 3 represents an arrangement in which the aforementioned elements lie on one plane. By virtue of cardanic mounting 17, all elements can be independently adjusted with respect to their functional operations described above. The direction and amplitude of oscillation can be determined by means of a connector oriented along the mirror axis 18 and the spring-mounted rotating ring 19. Advantageous here is the compact design and the avoidance of multiple beam switching which are always associated with a loss of precision and light intensity.

Figure 4:
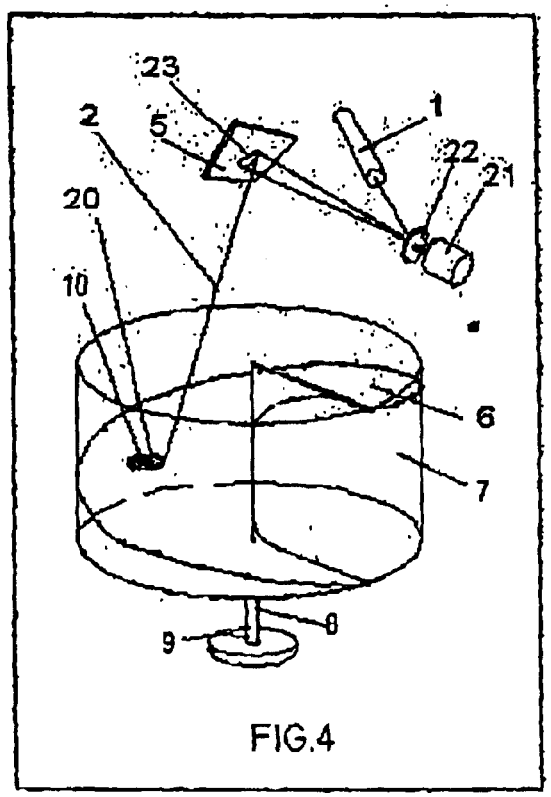
FIG. 4 apparatus for producing horizontal circular picture element groups

The apparatus pursuant to FIG. 4 represents an arrangement that can be used as a 3D mouse. The image beam 2 strikes a rotating mirror 22, which is driven by the motor 21 and whose normal mirror line deviates slightly from rotation axis of the motor 21. This creates in the reflection a image beam circle 23 which is projected via the tilted mirror 5 onto the helix 6, where is produces a circular mouse pointer 20 around the picture element 10. Guided by hand with a 3D input device, such a mouse pointer can be moved to any x,y,z position in the cylinder 7. A numerical comparison with the programmed sequence of images in the cylinder determines which, if any, of the graphically displayed objects is momentarily targeted by the mouse pointer.

Figure 5:
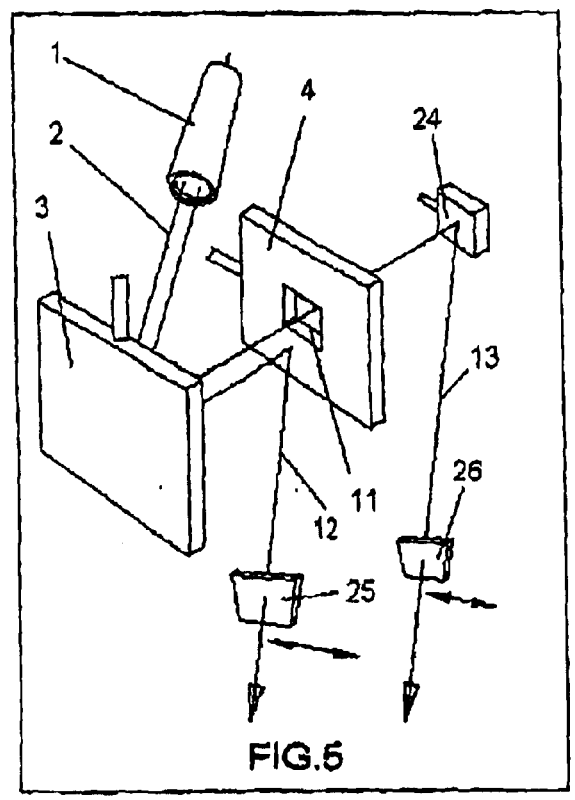
FIG. 5 apparatus for producing vertical linear picture element groups

The apparatus pursuant to FIG. 5 represents and arrangement that produces line segments in the direction of the image beam 12. They can be of any length and may lie above as well as below the position of the main picture element. This is achieved as follows. The image beam reflected by the deflection mirror 3 is divided at the deflection mirror 4. Deflection mirror 4 and secondary mirror 24 reflect the main beam 12 and the secondary beam 13. Since both mirrors are coupled, the main beam 12 and the secondary beam 13 always remain parallel to each other. Both beams are provided with separate diaphragms 25 and 26. An open diaphragm allows the continuously radiating laser beams to pass. The diaphragm 25 at main beam 12 is only opened temporarily, thus producing the picture element 10. The diaphragm 26 at the secondary beam, in coordination with the rotational movement of the helix, can be open at any time and for any duration. For example, if the diaphragm 26 is open while the helix at the predetermined x,y,z position runs from where the height z=0 to the predetermined height z, the secondary beam then produces a line from the base of the cylinder to the x,y,z point. By causing the diaphragm 26 to oscillate during this time, a dashed line is produced. In practice the beams 12 and 13 must be directed very close to one another or merge with one another.

Figure 6:
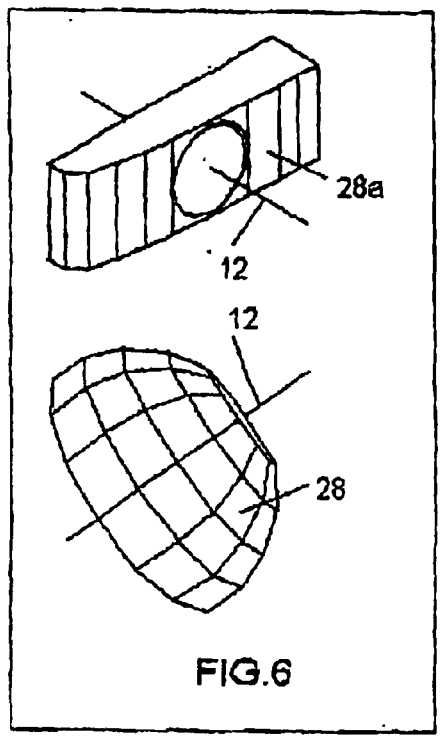
FIG. 6 apparatus for producing horizontal picture element groups as symbols
Figure 7:
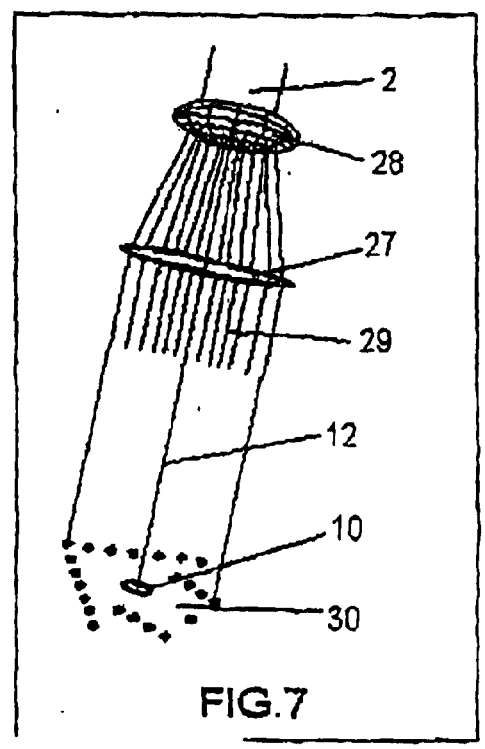
FIG. 7 apparatus for producing 2D copies of picture element groups.

The apparatus pursuant to FIGS. 6 and 7 represents an arrangement which produces picture element groups whose picture elements are generated in parallel (simultaneous) fashion. In this case, image beam splitters made from linear optical elements are employed. In this example, the image beam splitters are composed of planar facets 28 or linear facets 28a. The image beam 2 strikes the image beam splitter in the direction of the main beam 12 and is split. The main beam 2 passes unimpeded through the optically inactive region provided in accordance with its size, while at the same time a separate secondary beam is produced at each facet lying in the beamed region. The orientation of each facet can be predetermined separately and thus also the deflection of the associated secondary beam with respect to the main beam 12. In this manner, picture element groups can be produced as patterns. A convex lens 27 merges the secondary beams to create a secondary beam cluster 29 which runs in the direction of the main beam 12 and which represents a picture element symbol 30 in addition to the picture element 10. The picture element symbol can be enlarged and reduced by a revolver-like change of convex lenses 27. It can be rotated by rotating the image beam splitters 28 about the main beam 12. In a limit case of this example, the image beam splitter 28a can be a cylindrical lens, thus turning a linear arranged picture element group into a continual line. The exemplary image beam splitter shown here can, in a limit case, be turned into one or more open or closed curved arrangements, which in a special case can also be one or more circles.

Figure 8:
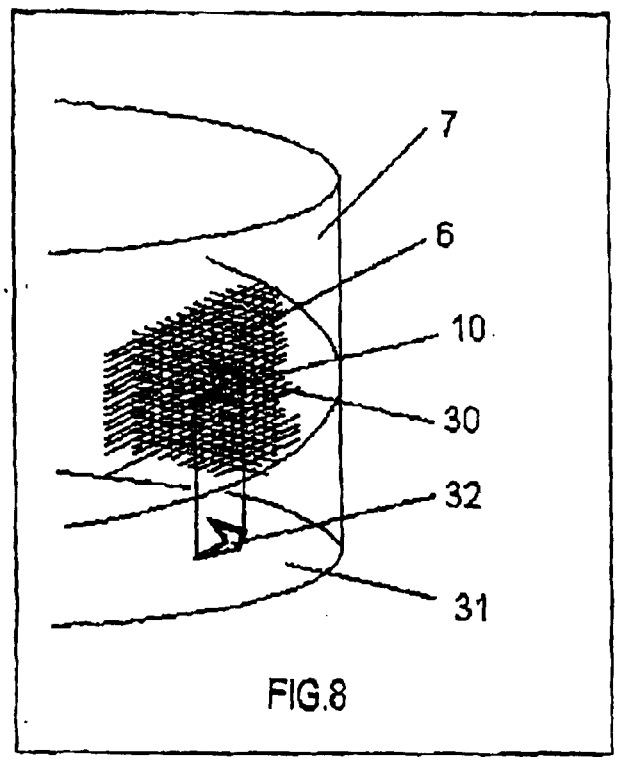
FIG. 8 combined application of different apparatus

The apparatus pursuant to FIG. 8 represents an arrangement used to turn the 3D image into a picture element group which depicts a 2D projection of the 3D image. For this purpose, the helix 6 in the cylinder 7 is designed as a finely woven net and acts as a planar image beam splitter. Every 3D image produced on the helix 6, for example comprising a central picture element 10 and an accompanying picture element symbol 30, then appears in the extension of the main beam as a 2D copy 21 in this example on the bottom of the cylinder.

Figure 9:
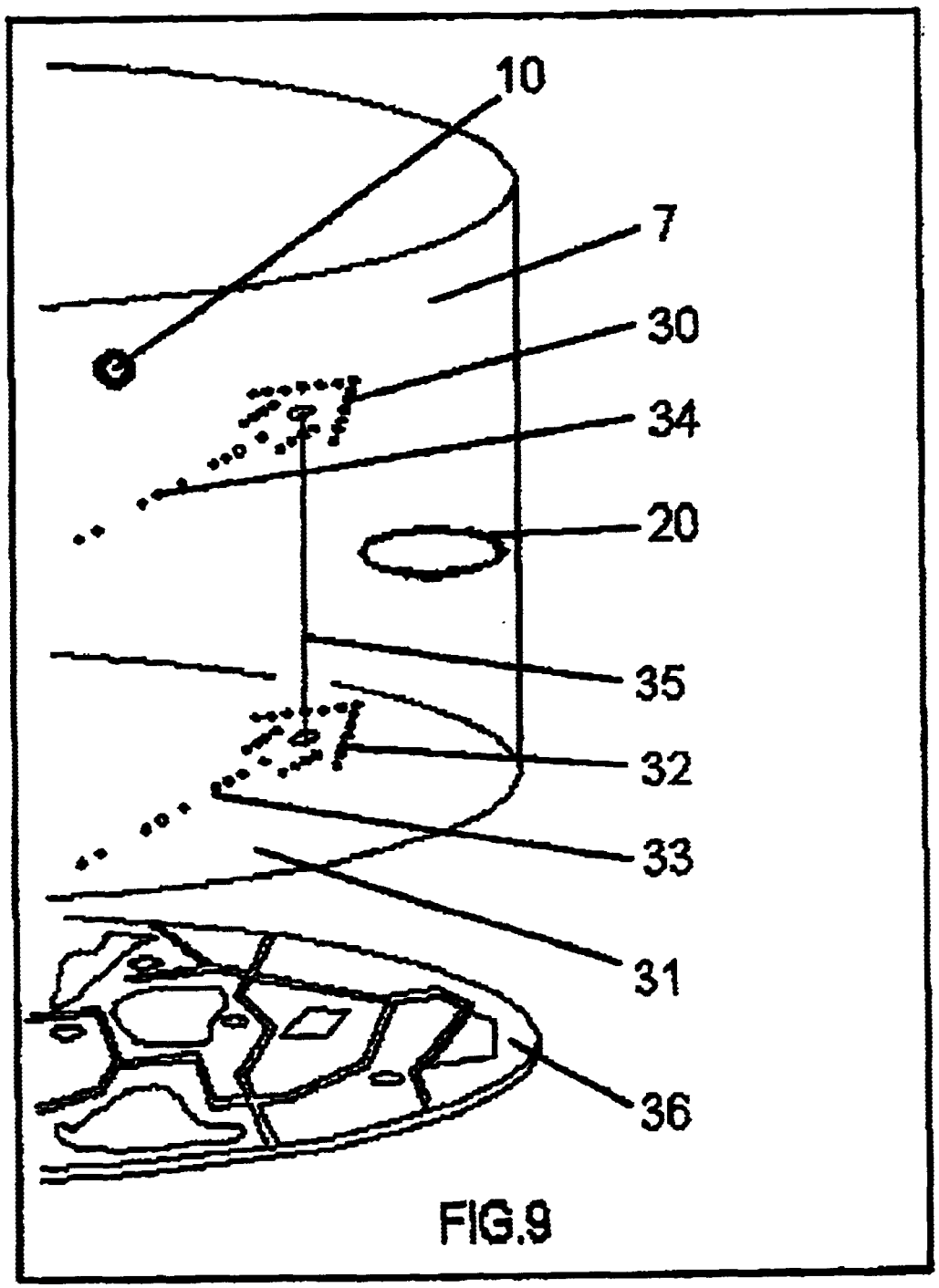
FIG. 9 shows how a number of the described apparatus interact.

The apparatus pursuant to FIG. 9 shows how a number of the apparatus described above interact. Because deflection systems were normally unable to generate any number of picture elements, such application were hitherto limited to the representation of objects in the form of individual picture elements or as a cluster of such picture elements 10.

3D scenarios can now be represented by picture element groups in a more informative manner. Thus, in addition to a main image, a picture element symbol 30, for example in the form of an arrow or airplane, can be shown with respect to size and direction (cf. FIG. 7). At the same time a linear picture element group can represent a flight direction vector 34 for direction and velocity (either according to FIG. 3 or FIG. 6). A flight altitude vector 35 can also be represented (cf. FIG. 5). At the same time, the 2D copies 32 and 33 of the entire 3D image can be generated (cf. FIG. 8). They can appear as shown here on the cylinder bottom 31 while a map 36 is projected there at the same time. This can also be projected through an open cylinder bottom 31 onto a remote map 36 located below it. At the same time an independent picture element group, serving as a mouse pointer 20, can be manually guided in the cylinder (cf. FIG. 4) and call up information from the computer about an object it clicks on. A 2D copy of this also appears at the bottom of the cylinder. Parallax deviations can be kept to a minimum by using long beam paths, which can be tolerated anyway in applications having an image space that is not greatly occupied.

This makes it possible to produce a 3D representation of flying objects in space and at the same time present them as a 2D image in an interchangeable map, for example one projected from below.

What is claimed is:

1. Apparatus for producing picture element groups of predetermined geometric appearance in space with
   means (1) for producing light pulses in rapid succession,
   a deflection system for deflecting the light pulses for the purpose of producing picture elements (10) on a rotatable projection surface (6).
   means for dividing the light of the light pulses into a main beam (12) and a secondary beam (13), it being possible to produce a picture element (10) on the projection surface (6),
   characterized by
   a secondary mirror (14), arranged in the projected path of the secondary beam (13) and capable of oscillating about a rotation axis (15), said secondary mirror (14) being suitable and provided for producing, by virtue of its oscillating movements, picture elements of a linear picture element group (34),
   wherein the secondary mirror (14) is rotatably mounted and wherein a rotation of the rotation axis (15) of the secondary mirror (14) is suitable and provided for influencing the direction of the linear picture element group (34).

2. Apparatus according to claim 1, wherein the secondary mirror (14) with its rotational axis (15) is rotatably mounted in a ring (16) which can be turned orthogonally with respect to the rotational axis (15).

3. Apparatus according to claim 1, wherein a single, cardanic-mounted mirror (3,4) is provided for deflecting the main beam (12), said mirror (3,4) assuming the function of two independently adjustable deflection mirrors (3 and 4) by virtue of its cardanic mounting (17).

4. Method for the operation of an apparatus according to claim 1, wherein the frequency of oscillation at which the oscillating secondary mirror (14) oscillates, or the rotation frequency at which the rotating mirror (22) rotates, differs from the rotational speed of the projection surface (6).

5. Apparatus according to claim 1, wherein the projection surface (6) is a helix.

6. Apparatus according to claim 5, wherein the projection surface (6) is configured as a closely woven net so that the picture elements of the main beam (10) and secondary beam (12, 13) appear on the projection surface (6) as well as on a bottom (31) of a cylinder (7) in which the projection surface (6) is arranged and capable of rotation.

7. Apparatus according to claim 1, wherein the means for dividing the light or the laser (1) into a main beam (12) and a secondary beam (13) include a deflection mirror (4 or 3,4) which has in particular in its middle a light-permeable region or preferably a cutout (11), wherein a part of the light of the laser (1) is deflected by the deflection mirror (4) as the main beam (12) and a part of the light of the laser (1) passes through the cutout (11) of the deflection mirror (4) as the secondary beam (13).

8. Apparatus for producing picture element groups of predetermined geometric appearance in space with a laser (1) and with a deflection system for deflecting the direction of the laser (1) in order to produce picture elements (10) on a rotating projection surface (6),
wherein the light of the laser (1) is divided into a main beam (12) and at least one secondary beam (13),
wherein the main beam (12) for producing a picture element (10) is deflected by a deflection mirror (4) onto the projection surface (6),
wherein the secondary beam (13) is deflected with a secondary mirror (14) onto the projection surface (6), characterized by
the secondary mirror (14), arranged in the projected path of the secondary beam (13) and capable of oscillating about a rotation axis (15), said secondary mirror (14) being suitable and provided for producing, by virtue of its oscillating movements, picture elements of a linear picture element group (34),
wherein the secondary mirror (14) is turned along with the rotation axis (15) for influencing the direction of the linear picture element group (34).

9. Apparatus for producing picture element groups of predetermined geometric appearance in space with means (1) for producing light pulses in rapid succession,
a deflection system for deflecting the light pulses for the purpose of producing picture elements (10) on a rotatable projection surface (6),
means for dividing the light of the light pulses into a main beam (12) and a secondary beam (13), it being possible to produce a picture element (10) on the projection surface (6), characterized by
a secondary mirror (14), arranged in the projected path of the secondary beam (13) and capable of oscillating, said secondary mirror (14) being suitable and provided for producing, by virtue of its oscillating movements, picture elements of a linear picture element group (34),
wherein the secondary mirror (14) is arranged at one end of a connecting piece running in the direction of the mirror axis (18) and wherein the other end of the connecting piece is spring-mounted in a device provided for the purpose of specifying a direction of oscillation of the secondary mirror (14), in particular in a rotatable ring (19),
wherein a rotation of the device, in particular of the ring (19), is suitable and provided for influencing the direction of the linear picture element group (34).

10. Apparatus according to claim 9, wherein the secondary mirror (14) is arranged in a cutout of a mirror (3,4) provided for deflecting the main beam (12).

11. Method for the operation of an apparatus according to claim 9, wherein the frequency of oscillation at which the oscillating secondary mirror (14) oscillates, or the rotation frequency at which the rotating mirror (22) rotates, differs from the rotational speed of the projection surface (6).

12. Apparatus according to claim 9, wherein the projection surface (6) is a helix.

13. Apparatus according to claim 12, wherein the projection surface (6) is configured as a closely woven net so that the picture elements of the main beam (10) and secondary beam (12, 13) appear on the projection surface (6) as well as on a bottom (31) of a cylinder (7) in which the projection surface (6) is arranged and capable of rotation.

14. Apparatus according to claim 9, wherein the means for dividing the light of the laser (1) into a main beam (12) and a secondary beam (13) include a deflection mirror (4 or 3,4) which has in particular in its middle a light-permeable region or preferably a cutout (11), wherein a part of the light of the laser (1) is deflected by the deflection mirror (4) as the main beam (12) and a part of the light of the laser (1) passes through the cutout (11) of the deflection mirror (4) as the secondary beam (13).

15. Method for producing picture element groups of predetermined geometric appearance in space with a laser (1) and with a deflection system for deflecting the direction of the laser (1) in order to produce picture elements (10) on a rotating projection surface (6), comprising the steps of:

dividing the light of the laser (1) into a main beam (12) and at least one secondary beam (13), deflecting the main beam (12) for producing a picture element (10) by a deflection mirror (4) onto the projection surface (6), deflecting the secondary beam (13) with a secondary mirror (14) onto the projection surface (6), wherein the secondary mirror (14), arranged in the projected path of the secondary beam (13) and capable of oscillating about a rotation axis (15), said secondary mirror (14) being suitable and provided for producing, by virtue of its oscillating movements, picture elements of a linear picture element group (34), wherein the secondary mirror (14) is mounted and capable of oscillating in a rotation axis (15), which preferably lies parallel to the surface of the main mirror, and wherein the rotation axis (15) can be turned along with the secondary mirror (14) about a rotational axis which preferably lies perpendicular to the surface of the main mirror.

* * * * *